United States Patent
Bosworth et al.

(10) Patent No.: US 8,438,271 B2
(45) Date of Patent: May 7, 2013

(54) PERFORMING SERVICES IN A NETWORK DATA PROCESSING SYSTEM

(75) Inventors: Thomas R. Bosworth, Jacksonville, FL (US); Anthony A. Stafford, Sandhurst (GB); Susan Stafford, legal representative, Sandhurst (GB)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 12/836,133

(22) Filed: Jul. 14, 2010
(Under 37 CFR 1.47)

(65) Prior Publication Data
US 2012/0016978 A1    Jan. 19, 2012

(51) Int. Cl.
*G06F 15/16* (2006.01)
(52) U.S. Cl.
USPC .......................... 709/224; 709/201; 709/223
(58) Field of Classification Search .................. 709/201, 709/224
See application file for complete search history.

(56) References Cited

U.S. PATENT DOCUMENTS

| | | | |
|---|---|---|---|
| 6,553,408 B1 * | 4/2003 | Merrell et al. | 709/213 |
| 2003/0233631 A1 | 12/2003 | Curry et al. | |
| 2005/0234767 A1 * | 10/2005 | Bolzman et al. | 705/11 |
| 2008/0319812 A1 | 12/2008 | Sousa et al. | |

OTHER PUBLICATIONS

Shan et al., "Panel 2 Smarter SOA", 2008 IEEE Congress on Services Part II, pp. 8-9.
Lopes et al., "Dynamic Service Integration using Web-based Workflows", Proceedings of iiWAS2008,Nov. 2008 Linz Austria, ACM, pp. 622-625.
Ibrahim et al., "MySIM: A Spontaneous Service Integration Middleware for Pervasive Environments", ICPS'09 Jul. 2009 London UK, ACM, pp. 1-10.
Feldmann et al., "Overview of an End-user enabled Model-driven Development Approach for Interactive Applications based on Annotated Services", WEWST2009 Nov. 2009 Endhoven Netherlands, 2009 ACM, pp. 19-28.

\* cited by examiner

*Primary Examiner* — Wing F Chan
*Assistant Examiner* — Andrew Woo
(74) *Attorney, Agent, or Firm* — Yee & Associates, P.C.; Arthur Samodovitz

(57) ABSTRACT

A method, computer, and computer program product for performing a service. A processor unit identifies information about a network data processing system for performing the service. The processor unit identifies a plurality of steps used to perform the service. The processor unit identifies a set of software tools needed in each step in the plurality of steps to perform the service on the network data processing system. The set of software tools is identified based on the information identified. The information comprises at least one of a type of optimization performance system, a type of cluster, and a configuration of the cluster.

13 Claims, 11 Drawing Sheets

FIG. 7

| | NAME | TYPE | ENVIRONMENT REQUIREMENTS | CAPABILITIES |
|---|---|---|---|---|
| 712 | RAID CONFIGURATION UTILITY | DISK ARRAY TOOL | OPERATING SYSTEMS: LINUX; HARDWARE: POWERPC | CREATE AND DELETE DISK ARRAYS; ALL RAID MODES SUPPORTED |
| 714 | DISK ARRAY MANAGER | DISK ARRAY TOOL | OPERATING SYSTEMS: IBM AIX; HARDWARE: POWERPC | CREATE AND DELETE DISK ARRAYS; ALL RAID MODES SUPPORTED |
| 716 | STORAGE MANAGER A | DATA MOVER | OPERATING SYSTEMS: LINUX; HARDWARE: POWERPC; DRIVE ARRAY MANUFACTURERS: IBM STORAGE MANAGER MANAGED DRIVE ARRAY OR NETWORK BASED DRIVE ARRAY | MOVES DATA; COPIES DATA; ABILITY TO PERFORM OPERATIONS IN THE BACKGROUND, AND TO WAIT BEFORE PROCESSING ADDITIONAL COMMANDS |
| 718 | STORAGE MANAGER B | DATA MOVER | OPERATING SYSTEMS: IBM AIX; HARDWARE: POWERPC; DRIVE ARRAY MANUFACTURERS: IBM STORAGE MANAGER MANAGED DRIVE ARRAY OR NETWORK BASED DRIVE ARRAY | MOVES DATA; COPIES DATA; ABILITY TO PERFORM THE OPERATIONS IN THE BACKGROUND, AND TO WAIT BEFORE PROCESSING ADDITIONAL COMMANDS |
| 720 | NETWORK MANAGER | NETWORK MONITOR | OPERATING SYSTEMS: SOLARIS v9, SOLARIS v10; HARDWARE: SUN FIRE v210 SERVER; OPERATING SYSTEM: LINUX; HARDWARE: INTEL PC; OPERATING SYSTEM: WINDOWS; HARDWARE: PC; OPERATING SYSTEM: AIX; HARDWARE: IBM eServer | MONITORS NETWORK BANDWIDTH; MANAGES NETWORK COMPONENTS |
| 722 | APPLICATION SERVER NETWORK DEPLOYMENT ADMINISTRATION TOOL | CLUSTER MANAGEMENT | OPERATING SYSTEMS: IBM AIX; LINUX; SOLARIS; WINDOWS; | MANAGES APPLICATION SERVERS AND CLUSTERS APPLICATION MONITORING |

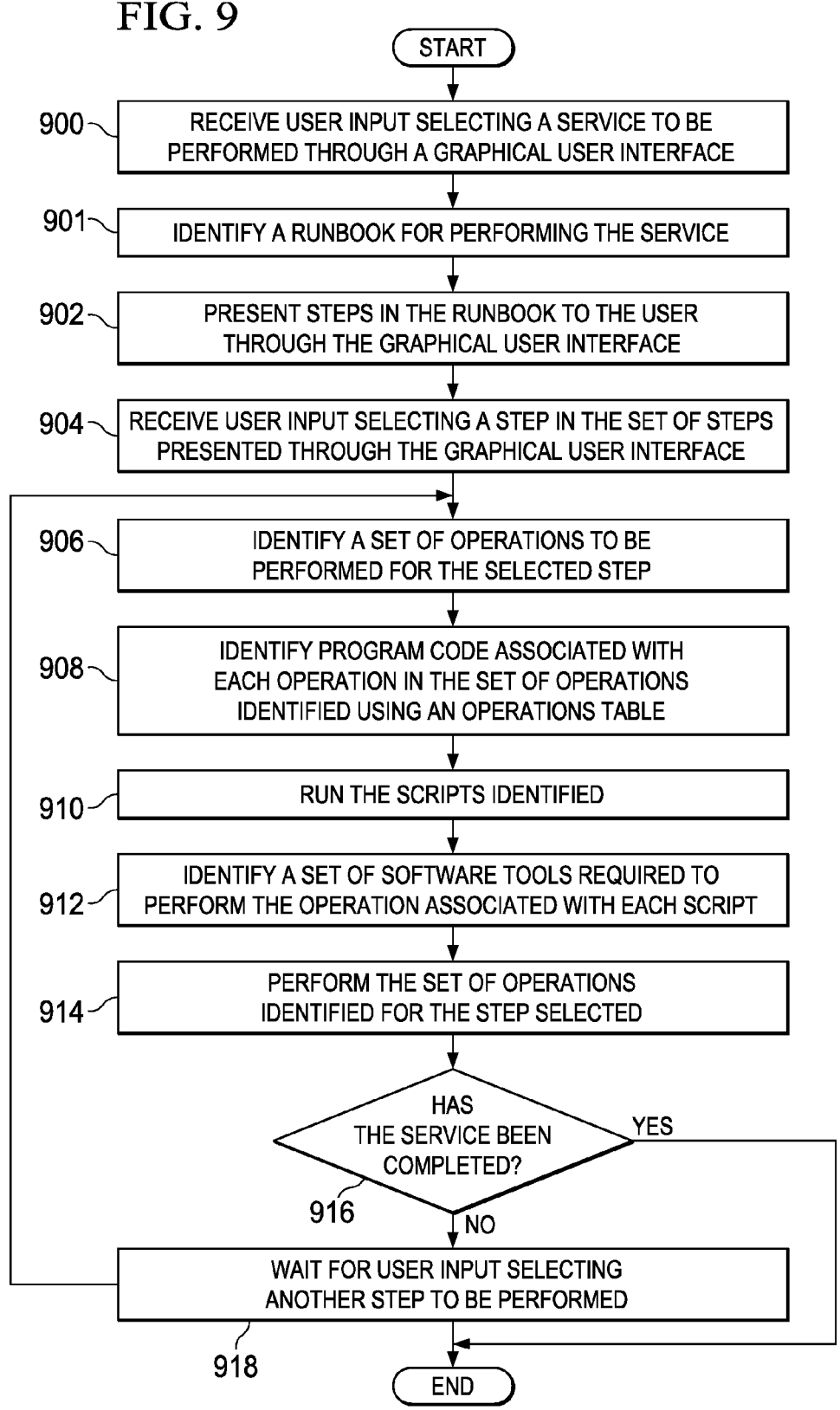

PERFORMING SERVICES IN A NETWORK DATA PROCESSING SYSTEM

BACKGROUND

1. Field

The present invention relates generally to performance of management or other services on a network data processing system. Still more particularly, the present invention relates to an automated method and apparatus for selecting tools to perform management or other services on a network data processing system.

2. Description of the Related Art

Network data processing systems are used by many organizations to perform different operations. For example, a company may sell goods using a website run on a network data processing system. The website may include software to process orders, receive payments, provide information, and/or perform other suitable functions.

As another example, other organizations may use network data processing systems to perform operations, such as creating program code for software products, performing human resource operations, analyzing data, and/or performing other similar operations.

With network data processing systems, maintenance, updates, and changes to hardware and software in the network data processing system may occur periodically. For example, an organization may add a data center, replace an old data center, add transaction processing to a website, replace a storage system, and other changes.

These types of changes to a network data processing system are often performed by a service provider. The service provider identifies information about the current network data processing system. The service provider then adds hardware, software, or a combination of the two to implement the changes to the network data processing system.

The changes may require a number of different steps to be performed by personnel for the service company. These personnel are often experienced information technology employees. After the changes have been made, the service provider also may include training for different people in the organization using the network data processing system.

Computer tools are currently available to assist the personnel in performing the management and other services on the data processing system. However, human expertise and human analysis are often required to determine the best tools to utilize, and often a tool which is not optimum is selected.

SUMMARY

The different illustrative embodiments provide a method, computer, and computer program product for performing a service on a data processing system. A processor unit identifies information about the network data processing system for performing the service. The information comprises at least one of a type of optimization performance system for monitoring an operating system in the network data processing system, a type of cluster used in the network data processing system, and a configuration of the cluster. The processor unit identifies a plurality of steps used to perform the service. Based in part on the identified information, the processor unit identifies a set of software tools needed in each of the steps to perform the service on the network data processing system.

BRIEF DESCRIPTION OF THE SEVERAL VIEWS OF THE DRAWINGS

FIG. 7 is an illustration of a table for software tools for a runbook in accordance with an illustrative embodiment of the present invention;

FIG. 9 is an illustration of a flowchart of a process for performing the steps in a runbook in accordance with an illustrative embodiment;

DETAILED DESCRIPTION

Figure 1:
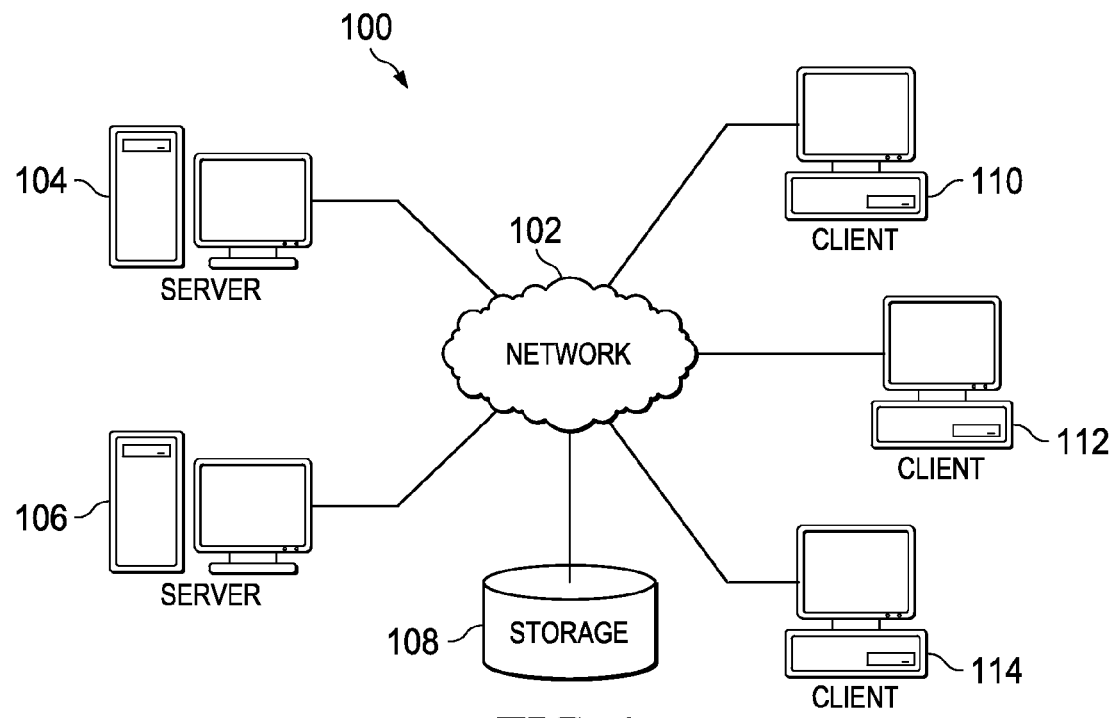
FIG. 1 is an illustrative diagram of a data processing environment in which illustrative embodiments of the present invention may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product comprising computer readable program code stored on a tangible computer readable storage medium.

Any combination of one or more computer readable storage devices(s) may be utilized. The tangible computer-readable storage device may be, for example, an electronic, magnetic, optical, electromagnetic, infrared, or semiconductor system, apparatus or device. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The computer program can be stored on a fixed or portable computer readable storage device or downloaded from the Internet via a network. In these illustrative examples, the terms "computer readable storage device" and "computer readable storage devices" do not include propagation media.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which provides communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110. One or more illustrative embodiments may be implemented to perform the changes to network data processing system 100. For example, these changes may be to a portion or all of network data processing system 100.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
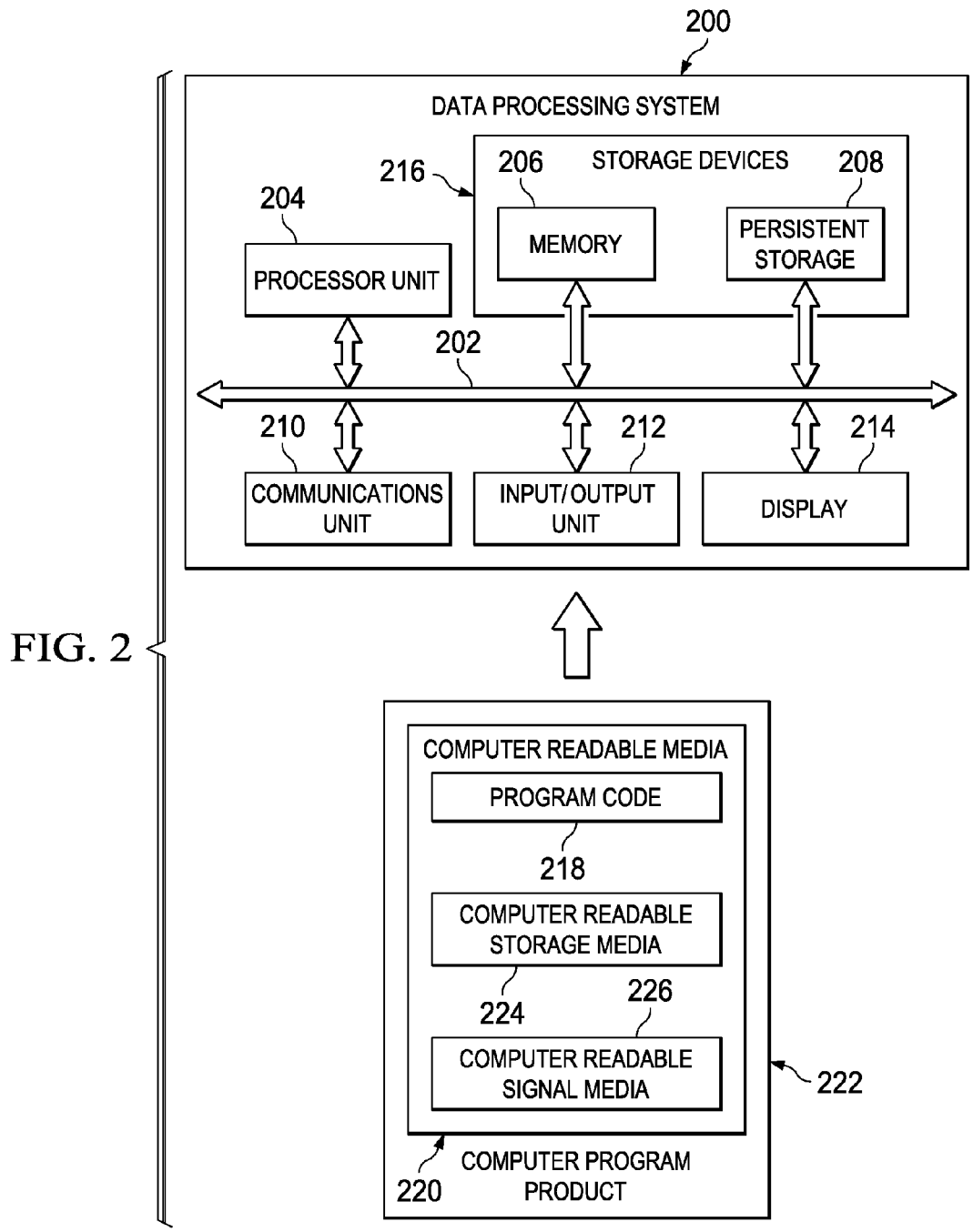
FIG. 2 is an illustration of a data processing system in accordance with an illustrative embodiment of the present invention.

Turning now to FIG. 2, an illustration of a data processing system is depicted in accordance with an illustrative embodiment. Data processing system 200 is an example of a data processing system that may be used to implement client computers, server computers, or a combination of the two in network data processing system 100 in FIG. 1. In this illustrative example, data processing system 200 includes communications fabric 202, which provides communications between processor unit 204, memory 206, persistent storage 208, communications unit 210 input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. Storage devices 216 are computer readable storage devices in these examples. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 or run by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 and run by processor unit 204. Program code 218 and computer readable media 220 form computer program product 222 in these examples. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

A storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

A service provider may have a limited number of personnel that have the experience and knowledge to perform certain changes to a network data processing system. As a result, these services offered by the service provider to clients may be limited based on the availability of the personnel. In other words, the service provider may not be able to provide services to all the clients needing services within the time frame desired by the clients. Some clients may have to wait until a later point in time for obtaining service from the service provider.

For example, with a network storage system, personnel with knowledge about network storage systems may be limited in number. As a result, the ability of a service provider to install a network storage system may be limited based on the number of personnel that have the knowledge and experience with these types of systems. Further, a service provider may be unable to provide this type of service to a client as quickly as desired by a client. The different illustrative embodiments recognize and take into account that it would be desirable for a service provider to be able to increase the ability to provide services to more clients without having more personnel with the currently needed knowledge and experience.

Thus, the different illustrative embodiments provide a method and apparatus for providing a service. The process begins by identifying information about a network data processing system performing the service. A plurality of steps used in performing the service is identified. A set of software tools needed in each step in the plurality of steps to perform the service on the network data processing system is identified. The set of software tools is identified based on the information identified about the network data processing system and at least one of a type of optimization performance system, a type of cluster, and a configuration of the cluster. In identifying the set of software tools, other factors also may be taken into account. These factors include for example, without limitation, a type of operating system, a type of storage, a type of volume manager, and other suitable information.

With the illustrative embodiments, services may be performed by personnel without the experience and/or knowledge normally needed to perform the service. In these illustrative examples, the service may be performed using software tools that perform the steps for the service. The different software tools needed for those steps may be identified for those modules using different illustrative embodiments. As a result, the personnel performing the service may not need to know about the different software tools and the steps required for performing the service.

Figure 3:
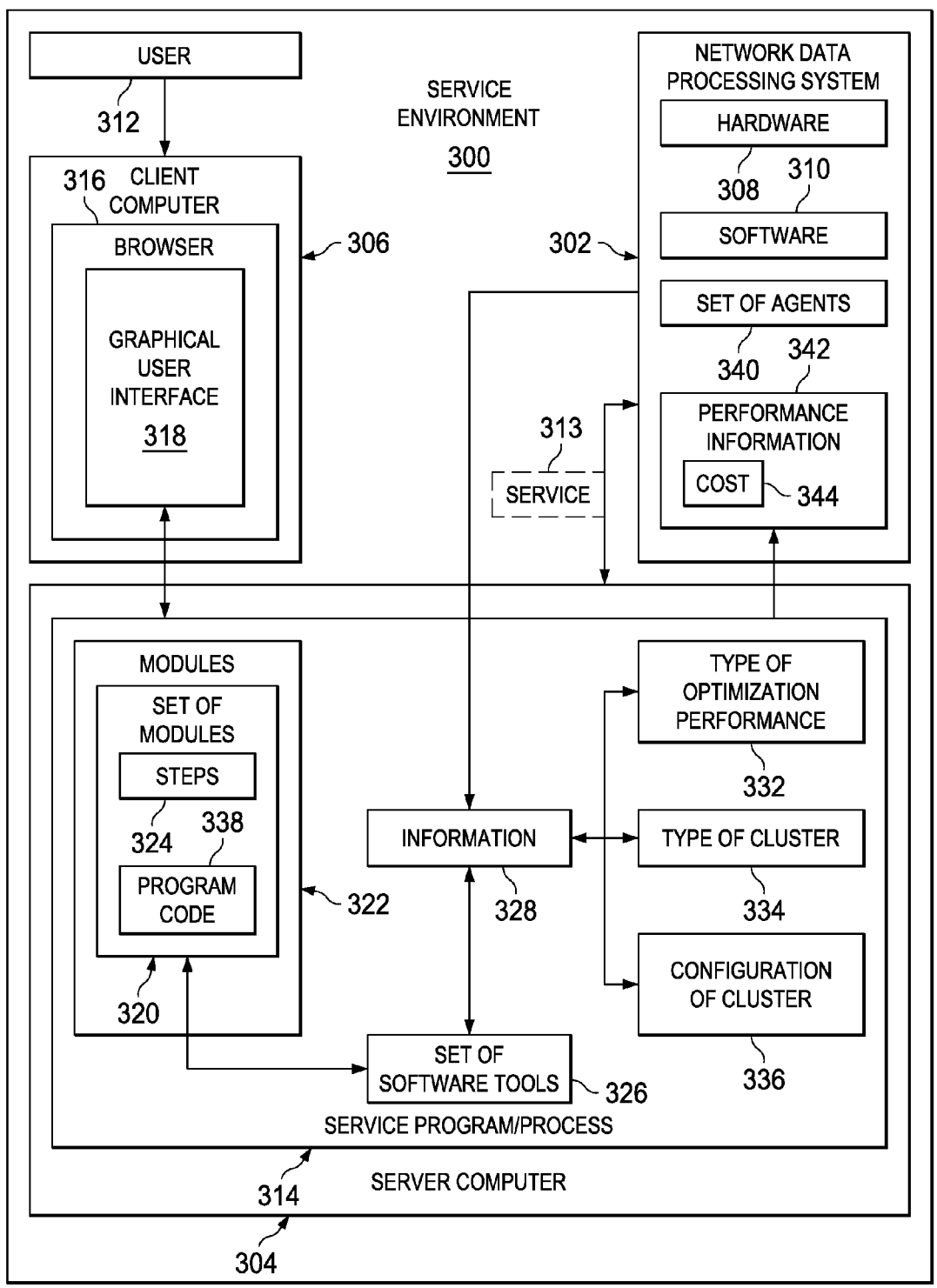
FIG. 3 is an illustration of a service environment in accordance with an illustrative embodiment of the present invention.

With reference now to FIG. 3, an illustration of a service environment is depicted in accordance with an illustrative embodiment. In this depicted example, service environment 300 includes network data processing system 302, server computer 304, and client computer 306.

Network data processing system 302 is a network data processing system in which changes may be made. In particular, the different illustrative embodiments may perform a service to make changes in network data processing system 302. These changes may include changes in hardware 308, software 310, or a combination of the two. For example, hardware 308 may be a server computer, a client computer, a router, a storage system, and/or other suitable types of hardware. Software 310 may be a new program running on the hardware to provide services. These services may include, for example, software 310 used to operate hardware 308 as a data center, a web server, and other suitable types of functions.

In these illustrative examples, user 312 may operate client computer 306 to perform changes to network data processing system 302 to perform service 313. In the different illustrative examples, user 312 may not need the experience and/or knowledge to make these changes with the use of service program/process 314 on server computer 304. User 312 may interact with service program/process 314 using browser 316 running on client computer 306. In particular, user 312 may interact with graphical user interface 318 in browser 316.

In these illustrative examples, user 312 may select set of modules 320 from modules 322 on server computer 304. A set, as used herein, when referring to items, means one or more items. For example, set of modules 320 is one or more modules. Set of modules 320 is used by service program/process 314 to perform service 313 for network data processing system 302. Set of modules 320 also may be referred to as a set of runbooks.

In these examples, each service may be associated with a set of modules in modules 322. Each set of modules in modules 322 comprises a set of steps for performing a particular service. In these illustrative examples, the set of steps for each set of modules is identified by, for example, a technical expert. As one illustrative example, set of modules 320 contains steps 324 for performing service 313. The selection of set of modules 320 may be performed in a number of different ways. For example, user 312 may select service 313 using graphical user interface 318, which in turn, results in set of modules 320 being selected.

After set of modules 320 has been selected, service program/process 314 identifies set of software tools 326 for each step in steps 324 to perform service 313 for network data processing system 302. Set of software tools 326 is identified using information 328 about network data processing system 302.

Information 328 may be about hardware 308, software 310, or a combination of the two within network data processing system 302. Information 328 provides a description of the environment for network data processing system 302. Information 328 may include information about, for example, without limitation, the operating system for network data processing system 302, software installed in network data processing system 302, hardware installed in network data processing system 302, firmware, an identification of servers that are virtualized, and/or other types of information.

In these illustrative examples, information 328 includes at least one of type of optimization performance system 332, type of cluster 334, configuration of cluster 336, and other types of information about network data processing system 302.

In these illustrative examples, information 328 includes at least one type of optimization performance system 332, type of cluster 334, and configuration of cluster 336.

Type of optimization performance system 332 is an identification of a software tool or other software program for monitoring an operating system. Type of cluster 334 identifies the type of physical range in the hardware devices in a network. For example, type of cluster 336 may provide an indication of how hardware devices are connected to each other. These hardware devices in a cluster may include, for example, without limitation, routers, server computers, load balancing computers, backup devices, failover server computers, and/or other suitable types of hardware. In these examples, a cluster is a group of computers that may work together. This group of computers may be viewed as a single computer by clients making requests to the computers in this group.

Configuration of cluster 336 identifies how the cluster is configured. For example, configuration of cluster 334 may include values for parameters for various hardware components in the cluster. Additional examples of information 328 include type of operating system, type of storage, type of volume manager, and/or other suitable information.

Information 328 may be identified prior to user 312 selecting set of modules 320. In some illustrative examples, information 328 may be identified in response to user 312 selecting set of modules 320. After user 312 selects set of modules 320, user 312 may generate user input to initiate steps 324 by set of modules 320. In other words, the user input may cause set of modules 320 to perform steps 324. In these examples, service program/process 314 runs set of modules 320.

In these illustrative examples, set of modules 320 is associated with program code 338 for performing steps 324. In particular, set of modules 320 comprises program code 338. Further, each step in steps 324 for set of modules 320 is associated with program code 338 to perform the step. As one illustrative example, user 312 selects a step in steps 324 using graphical user interface 318. In response to the selection of the step, program code 338 associated with the step is run to perform the step.

Additionally, one or more of steps 324 in set of modules 320 may require set of software tools 326 as identified by service program/process 314 using at least one of type of optimization performance system 332, type of cluster 334, and configuration of cluster 336 in information 328, and other types of information about network data processing system 302. Additionally, other types of information in information 328 may be used in identifying set of software tools 326. When program code 338 is run for steps requiring set of software tools 326, program code 338 uses service program/process 314 to identify set of software tools 326. Program code 338 then uses set of software tools 326 to perform the steps.

Program code 338 may be run on network data processing system 302 or on a remote computer. For example, program code 338 may be run on a remote computer from data processing system 302. Program code 338 may cause steps 324 to be performed in network data processing system 302. The performance of steps 324, in this example, may be performed through agents or other processes that receive commands or requests from program code 338.

As depicted, set of modules 320 communicates with set of agents 340 in network data processing system 302. Set of agents 340 may run on a computer, such as server computer 304 in network data processing system 302 to perform steps 324. In performing steps 324, set of agents 340 may run set of software tools 326 for one or more steps in steps 324. An agent in set of agents 340 is an agent program in these illustrative examples.

Additionally, set of agents 340 also may monitor the performance of steps 324 to generate performance information 342. Performance information 342 may be used to identify various metrics about the performance of steps 324. For example, cost 344 from performing the service may be identified using performance information 342. With this information, reductions in cost 344 may be identified and implemented in the performance of the service on other network data processing systems.

In this manner, the different illustrative embodiments may be used to perform services in network data processing system 302. With the different illustrative embodiment, these services may be performed using personnel with less experience than normally needed without using the different illustrative embodiments. Through the use of service program/process 314 to select set of modules 320 from modules 322 and the identification of set of software tools 326, service 313 may be performed with less user interaction to perform steps 324.

Further, the use of service program/process 314 allows for an increased scalability in offering service 313. In other words, service 313 may be offered to more clients without the experience and/or knowledge of the personnel being a limiting factor. Additionally, with the use of performance information 342, cost 344 may be reduced for future performance of service 313 for other network data processing systems. Also, the performance of service 313 may occur more quickly through the analysis of performance information 342. For example, steps 324 may be changed or altered to increase the speed and/or efficiency at which service 313 may be performed.

The illustration of service environment 300 in FIG. 3 is not meant to imply physical architectural limitations in a manner in which different illustrative embodiments may be implemented. Other components in addition and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative examples, browser 316 may run on server computer 304 rather than on client computer 306. In yet other illustrative examples, a program other than browser 316 may be used to interact with service program/process 314. In some illustrative examples, service program/process 314 may provide a graphical user interface without using browser 316. In yet other illustrative examples, different components may be located on other computers other than in the manner depicted in FIG. 3. For example, set of software tools 326 may be located on computers other than server computer 304. In some illustrative examples, set of software tools 326 may be located in network data processing system 302.

Figure 4:
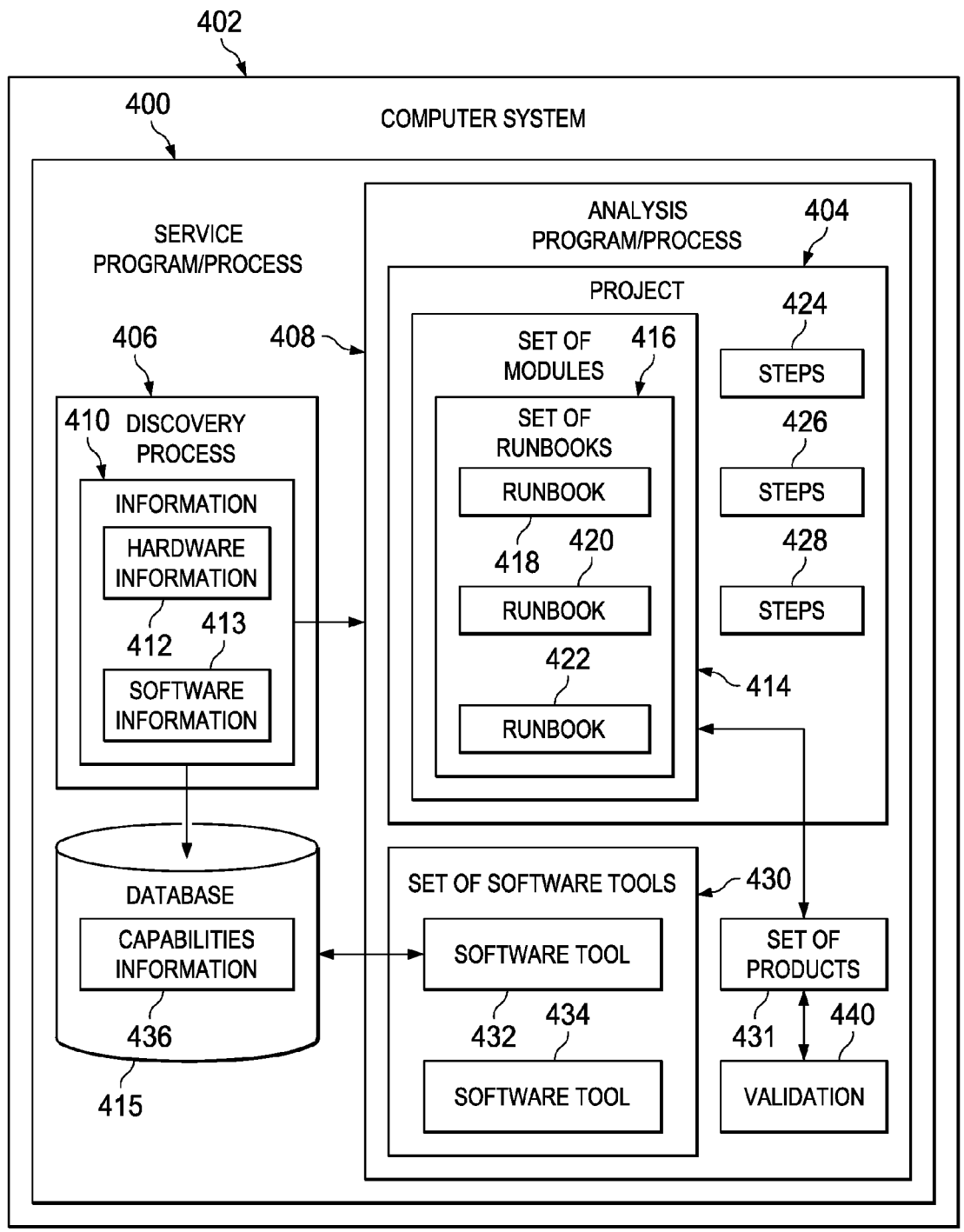
FIG. 4 is an illustration of a service process in accordance with an illustrative embodiment of the present invention.

With reference now to FIG. 4, an illustration of a service process is depicted in accordance with an illustrative embodiment. In this illustrative example, service program/process 400 is an example of one implementation for service program/process 314 in FIG. 3. Service program/process 400 may be run on computer system 402. Computer system 402 may be an example of one implementation for client computer 306 and server computer 304 in FIG. 3. Further, computer system 402 may be implemented using, for example, without limitation, data processing system 200 in FIG. 2.

A user may use service program/process 400 to perform a service for a network data processing system. The service may include changes to the hardware and/or software in the network data processing system. As depicted in this example, service program/process 400 includes discovery process 406 and analysis program/process 408. Discovery process 406 identifies information 410 about the components in the network data processing system. For example, information 410 includes hardware information 412 and/or software information 413 for the hardware and/or software components in the network data processing system. Information 410 may be stored in database 415.

In this illustrative example, information 410 in database 415 may be organized into sets of information 410. For example, each set of information 410 may be for a different network data processing system, a different client, a different client location, a different country, a different type of client, or some other type of category.

Service program/process 400 creates project 404. Project 404 is used to perform the service for the network data processing system. A project contains the information used to perform the service for the network data processing system. For example, project 404 may include, without limitation, roles, contacts, a basic schedule for performing the service, and/or other suitable information.

Analysis program/process 408 uses information 410 to identify set of modules 414 for project 404. Set of modules 414 takes the form of set of runbooks 416 in this illustrative example. A runbook is a set of extensible markup language (XML) definitions of steps that are performed for a service. In other words, a runbook is a compilation of procedures for performing at least a portion of the service.

In this illustrative example, set of runbooks 416 includes runbook 418, runbook 420, and runbook 422. Each of these runbooks includes steps needed to perform the service for the network data processing system. For example, runbook 418 includes steps 424, runbook 420 includes steps 426, and runbook 422 includes steps 428.

The user may select the hardware and/or software needed to perform steps 424, 426, and 428. In some illustrative examples, service program/process 400 may select the hardware and/or software needed to perform steps 424, 426, and 428 using information 410 identified by discovery process 406. The hardware and/or software selected to be operated to perform steps 424, 426, and 428 may form set of products 431 for each runbook in set of runbooks 416. Set of products 431 is the set of products to be operated when performing the steps for a runbook. A product is a hardware component or a software component in the network data processing system.

For example, the service to be performed for the network data processing system may be migration of a storage system from the network data processing system. In this example, set of products 431 may include, without limitation, a server computer, a set of disk arrays, backup software, and/or other types of products.

Additionally, analysis program/process 408 identifies set of software tools 430 that is used to perform steps 424, 426, and 428. Set of software tools 430 may be identified using information in database 415, for example. This information may include, for example, without limitation, a type of optimization performance, a type of cluster, a configuration for the cluster, and/or other types of information.

In this illustrative example, software tool 432 is identified for performing steps 424 and steps 426. Software tool 434 is identified for performing steps 428. Analysis program/process 408 also identifies the capabilities of set of software tools 430 using capabilities information 436 stored in database 415. In some illustrative examples, capabilities information 436 may be accessed by analysis program/process 408 from another database, a set of files, or some other suitable type of data structure or data storage.

In this illustrative example, analysis program/process 408 performs validation 440 for set of products 431. Validation 440 determines whether set of products 431 is supported by set of runbooks 416 and by set of software tools 430. Further, validation 440 also uses capabilities information 436 to confirm that set of software tools 430 has the capabilities needed to perform steps 424, 426, and 428. Once set of products 431 has been validated using validation 440, the user may follow the steps for set of runbooks 416 to perform the service for the network data processing system.

Figure 5:
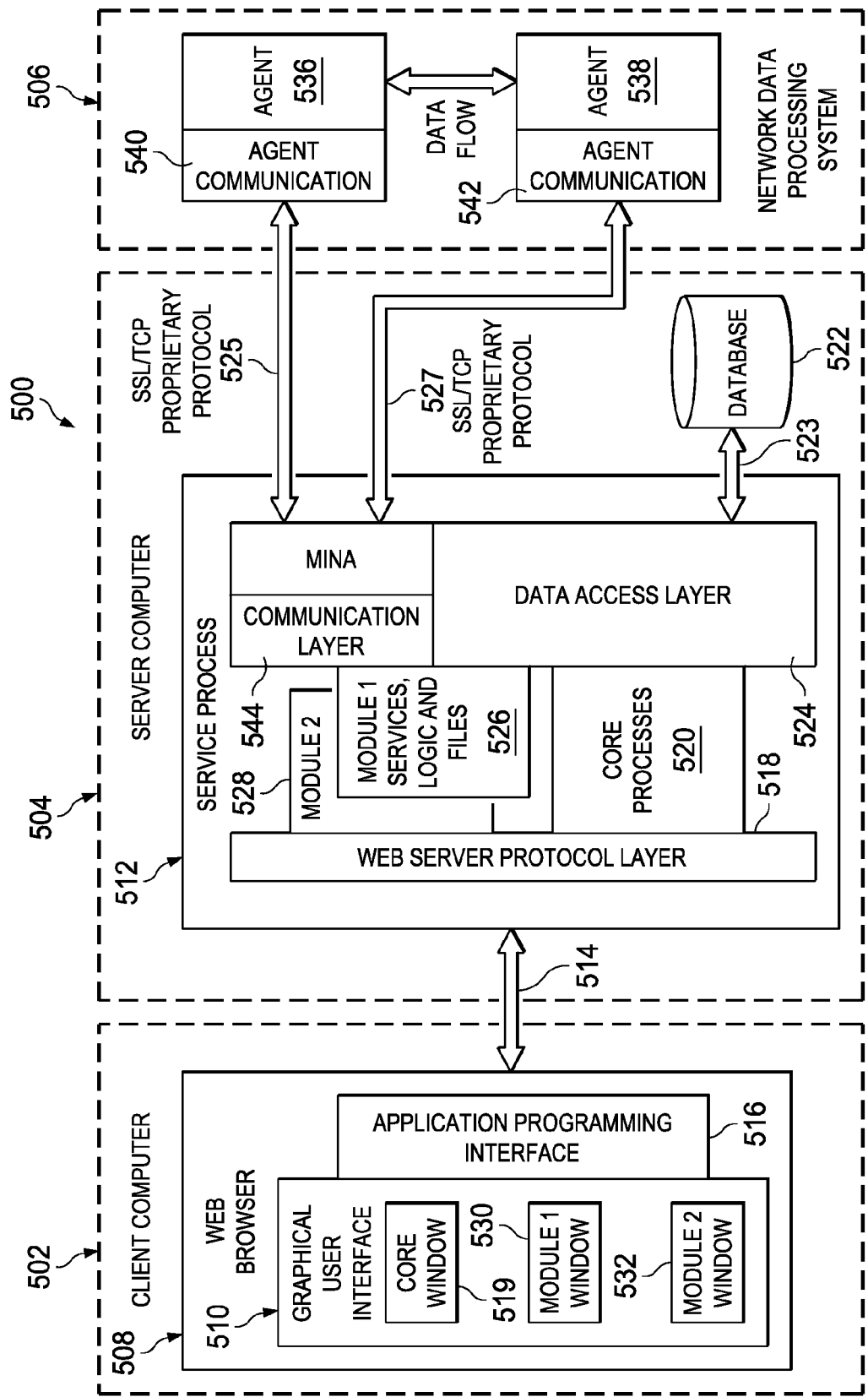
FIG. 5 is an illustration of a service environment in accordance with an illustrative embodiment of the present invention.

With reference now to FIG. 5, an illustration of a service environment is depicted in accordance with an illustrative embodiment. In this illustrative example, service environment 500 is an example of one implementation for service environment 300 in FIG. 3. As depicted in this example, service environment 500 includes client computer 502, server computer 504, and network data processing system 506.

Client computer 502 has web browser 508 running on client computer 502. Web browser 508 presents graphical user interface 510. A user may access service process 512 running on server computer 504 using graphical user interface 510 presented in web browser 508.

Information is exchanged between graphical user interface 510 and service process 512 using communications 514. Communications 514 use hypertext transfer protocol (HTTP) in this illustrative example. In particular, information is exchanged using application programming interface 516 for web browser 508 and web server protocol layer 518 for service process 512 running on server computer 504. For example, information being processed by core processes 520 in service process 512 may be sent from service process 512 to web browser 508 using web server protocol layer 518. Application programming interface 516 may be used to present this information in graphical user interface 510 as core window 519.

In response to a request to perform a service for network data processing system 506, service process 512 may use core processes 520 to identify information about the hardware and/or software operating in network data processing system 506. This information may be accessed from, for example, without limitation, database 522 using data access layer 524. In particular, the information in database 522 may be accessed using wireless communications 523. Communications 523 may use structured query language (SQL) in this illustrative example.

Additionally, service process 512 identifies module 1 526 and module 2 528 needed to perform the service for network data processing system 506. Each of these modules includes steps for performing at least a portion of the service for network data processing system 506. Module 1 526 may be presented in graphical user interface 510 as module 1 window 530. Module 2 528 may be presented in graphical user interface 510 as module 2 window 532.

In this illustrative example, the user at client computer 502 may select the hardware and/or software products in network data processing system 506 to be operated to perform the service for network data processing system 506. Service process 512 selects a set of software tools to perform the steps in the modules. Agent 536 and agent 538 in network data processing system 506 run the set of software tools selected to perform the steps in the modules to perform the service for network data processing system 506. The agents exchange information with service process 512 using communications layer 540 for agent 536, communications layers 542 for agent 538, and communications layer 544 for service process 512. This exchange of information may be performed using wireless communications 525 and wireless communications 527. These wireless communications may use, for example, without limitation, the Internet Protocol Suite (TCP/IP Protocol).

Agent 536 and agent 538 may monitor the performance of the steps in the modules by the set of software tools and generate performance information. This performance information may be sent to service process 512. Service process 512 may store this performance information in database 522.

Figure 6:
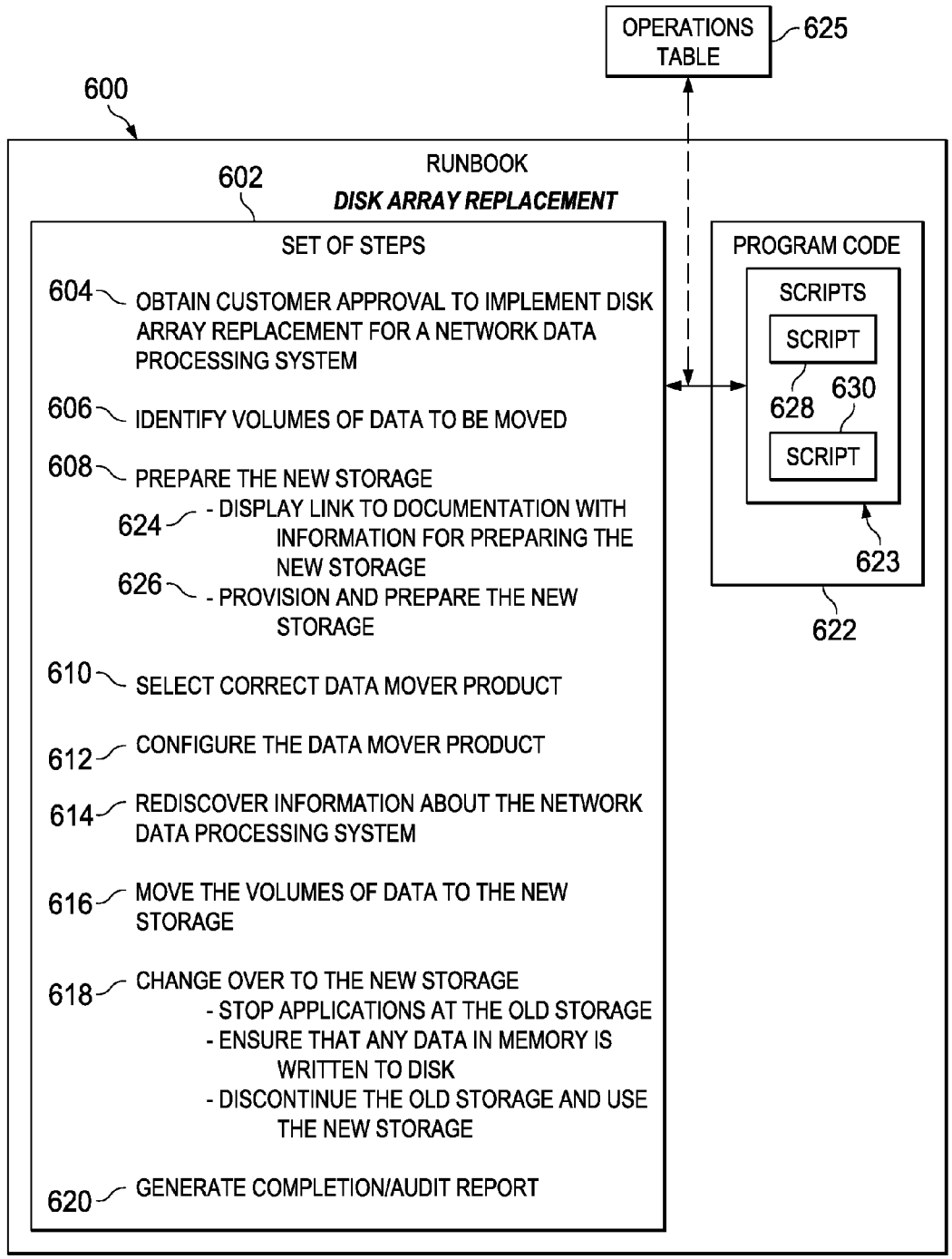
FIG. 6 is an illustration of a runbook for performing a service in accordance with an illustrative embodiment.

With reference now to FIG. 6, an illustration of a runbook for performing a service is depicted in accordance with an illustrative embodiment. Runbook 600 is an example of one implementation for a module in modules 322 in FIG. 3. Runbook 600 includes set of steps 602 to perform service 313 in FIG. 3. In this illustrative example, service 313 is for a replacement of a disk array in a network data processing system.

As depicted, set of steps 602 is comprised of steps 604, 606, 608, 610, 612, 614, 616, 618, and 620. Set of steps 602 may be presented to a user using, for example, graphical user interface 318 in FIG. 3. Each step in set of steps 602 may have one or more operations or substeps that are performed to complete the step. These operations are performed using program code 622 in these illustrative examples. Further, these operations may be performed by, for example, user 312 and/or service program/process 314 in FIG. 3.

Set of steps 602 is associated with program code 622. In particular, the operations that make up steps in set of steps 602 are associated with scripts 623 in program code 622 in this illustrative example. These associations may be made using operations table 625. Operations table 625 associates a particular operation to be performed with a script in program code 622 for performing the operation.

In one illustrative example, step 608 includes operation 624 and operation 626. When a user selects step 608 in runbook 600, the service program/process runs script 628 to perform operation 624 and runs script 630 to perform operation 626. The service program/process identifies script 628 for operation 624 and script 630 for operation 626 using operations table 625. In this illustrative example, script 628 may include program code that displays a link to documentation required for a user to perform operation 624 on a graphical user interface.

In this depicted example, script 630 includes program code that uses the service program/process to identify a set of software tools required to perform operation 626 in step 608. The set of software tools required is identified using capabilities information for the software tools and information about the network data processing system discovered using, for example, discovery process 406 in FIG. 4. Script 630 also includes program code to use the set of software tools identified to perform operation 626. In this manner, set of steps 602 in runbook 600 is performed with program code 622 identifying the set of software tools required for set of steps 602.

With reference now to FIG. 7, an illustration of a table for software tools for a runbook is depicted in accordance with an illustrative embodiment. In this illustrative example, table 700 is an example of information that may be found in a database, such as database 415 in FIG. 4. In particular, table 700 is an example of capabilities information 436 in database 415 in FIG. 4. Table 700 includes capabilities information for software tools for performing the steps in a runbook.

The software tools available for performing the steps in this runbook are presented in table 700. Table 700 presents information for software tools 702. This information includes name 704, type 706, environment requirements 708, and capabilities 710. Software tools 702 include, for example, redundant array of independent disks (RAID) configuration utility 712, disk array manager 714, storage manager A 716, storage manager B 718, network manager 720, and application server network deployment administration tool 722. In this illustrative example, software tools 702 may be needed for performing at least a portion of the steps in the runbook.

Figure 8:
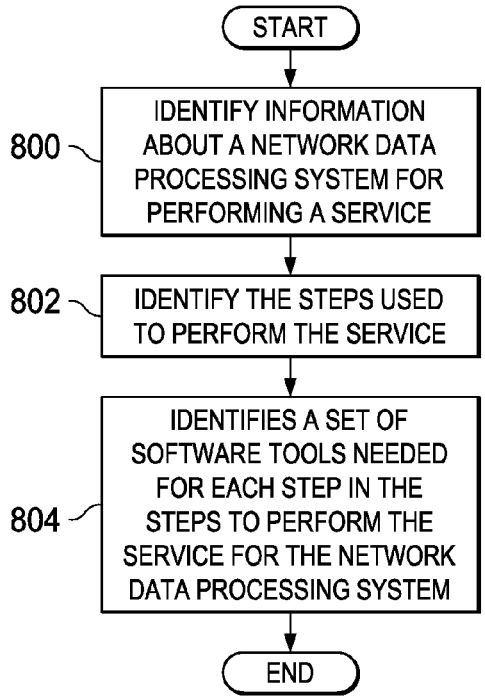
FIG. 8 is an illustration of a flowchart of a process for performing a service in accordance with an illustrative embodiment of the present invention.

With reference now to FIG. 8, an illustration of a flowchart of a process for performing a service is depicted in accordance with an illustrative embodiment. The process illustrated in FIG. 8 may be implemented to perform, for example, service 313 for network data processing system 302 in service environment 300 in FIG. 3. This process may be implemented in program code for service program/process 314 in FIG. 3. This program code may be run by a processor unit in a computer system.

The processor unit begins with service program/process 314 identifying information 328 about network data processing system 302 for performing service 313 (step 800). Information 328 may include information about hardware 308, software 310, or a combination of the two in network data processing system 302. Service program/process 314 identifies information 328 by, for example, querying network data processing system 302 for information 328. This querying may be performed by a discovery program, which also may be referred to as a discovery engine.

Thereafter, service program/process 314 identifies steps 324 used to perform service 313 (step 802). Service program/process 314 identifies steps 324 by matching steps 324 to information 328 identified. For example, different steps may be present for performing one operation using different hardware and/or software. Service program/process 314 may use information 328 to identify steps 324 that may be used to perform service 313 with the hardware and/or software present in network data processing system 302. Steps 324 may be steps within set of modules 320. Set of modules 320 is identified from modules 322. Each module in set of modules 320 includes a set of steps for performing at least a portion of service 313.

Service program/process 314 identifies set of software tools 326 needed for each step in steps 324 to perform service 313 for network data processing system 302 (step 804), with the process terminating thereafter. Service program/process 314 identifies set of software tools 326 based on the information identified for network data processing system 302. This information comprises at least one of a type of optimization performance system, a type of cluster, a configuration of the cluster, and other types of information about network data processing system 302. For example, service program/process 314 identifies set of software tools 326 that have a capability to perform steps 324 identified using information 328. Additionally, service program/process 314 may use a table, such as table 700 in FIG. 7, to identify set of software tools 326 based on information 328 and steps 324.

With reference now to FIG. 9, an illustration of a flowchart of a process for performing the steps in a runbook is depicted in accordance with an illustrative embodiment. The process illustrated in FIG. 9 may be implemented using service program/process 314 in service environment 300 in FIG. 3. In particular, this process is implemented using service program/process 314 to perform the steps in runbook 600 in FIG. 6.

Service program/process 314 receives user input selecting service 313 to be performed through graphical user interface 318 (step 900). Service program/process 314 then identifies runbook 600 for performing service 313 (step 901). In some illustrative examples, in step 901, this identification may be made by receiving user input selecting runbook 600. Service program/process 314 presents steps in set of steps 602 in runbook 600 to user 312 through graphical user interface 318 (step 902). Service program/process 314 then receives a selection of a step in set of steps 602 in user input (step 904). The user input may be generated by user 312 through graphical user interface 318.

Thereafter, service program/process 314 identifies a set of operations to be performed for the selected step (step 906). Service program/process 314 then identifies program code associated with each operation in the set of operations identified using an operations table (step 908). The operations table may be, for example, operations table 625 in FIG. 6. Further, in step 908, a script is identified for each operation in the set of operations in this illustrative example.

Service program/process 314 runs the scripts identified (step 910). In running the scripts, service program/process 314 identifies set of software tools 326 required to perform the operation associated with each script (step 912). In step 912, this identification is made using information 328 discovered about the network data processing system for which service 313 is being performed and information for the software tools. Further, the identification in step 912 may be that an operation requires no software tools.

Service program/process 314 then performs the set of operations identified for the step selected (step 914). In step 914, the set of operations may be performed using the set of software tools identified in step 912. Thereafter, service program/process 314 determines whether service 313 has been completed (step 916). If service 313 has been completed, the process terminates. Otherwise, service program/process 314 waits for user input selecting another step to be performed (step 918). The process then returns to step 906 as described above.

Figure 10:
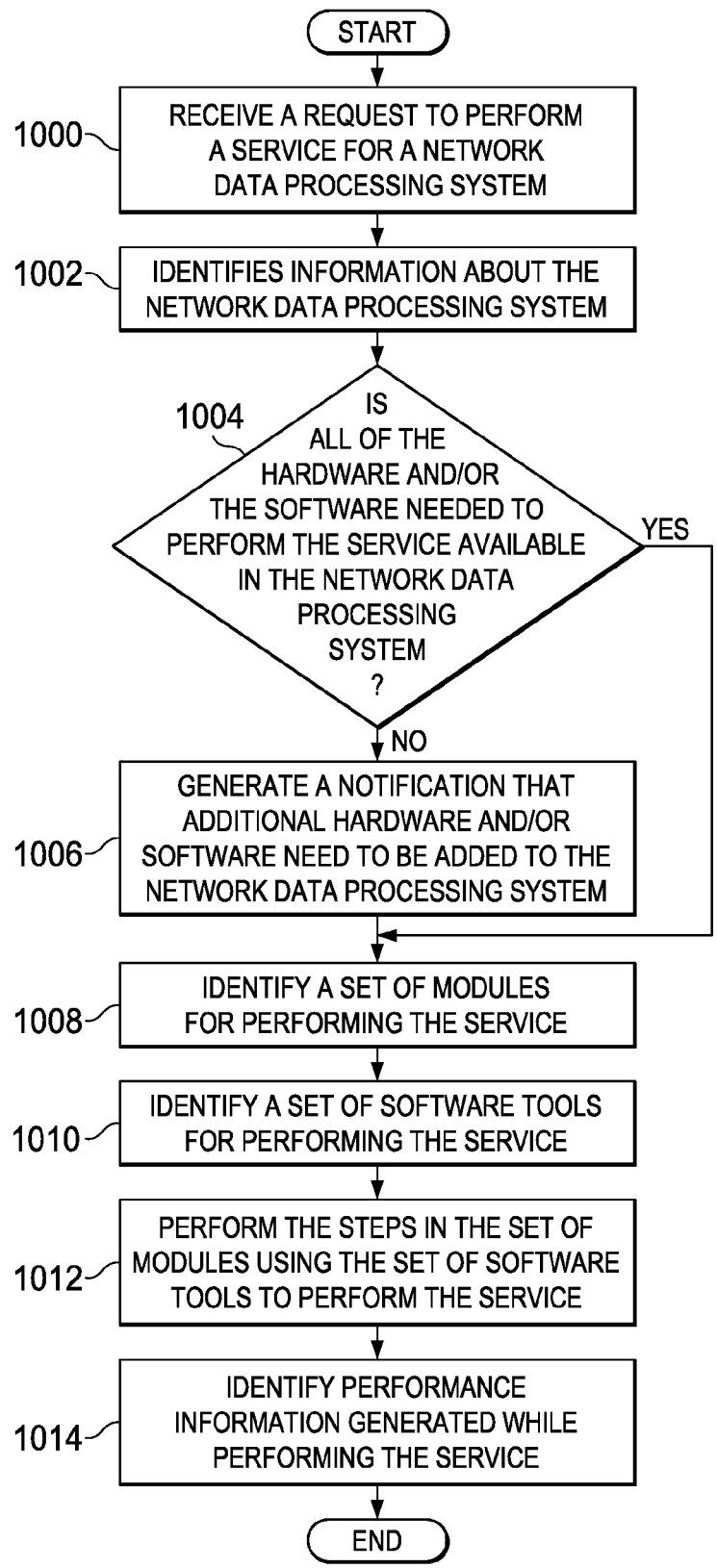
FIG. 10 is an illustration of a flowchart of a process for performing a service in accordance with an illustrative embodiment of the present invention.

With reference now to FIG. 10, an illustration of a flowchart of a process for performing a service is depicted in accordance with an illustrative embodiment. The process illustrated in FIG. 10 may be implemented in program code for service program/process 314 running on server computer 304 in FIG. 3. This process may be implemented to perform service 313 for network data processing system 302 in FIG. 3.

The process begins by service program/process 314 receiving a request to perform service 313 for network data processing system 302 (step 1000). The request may be received from client computer 306. In particular, a user at client computer 306 may enter user input through graphical user interface 318 to form the request received in step 1000.

Service program/process 314 then identifies information 328 about network data processing system 302 (step 1002). Service program/process 314 identifies information 328 by querying network data processing system 302 for information 328.

This information includes information about hardware, software, or a combination of the two in network data processing system 302. Service program/process 314 determines whether all of the hardware and/or software needed to perform service 313 are available in network data processing system 302 using information 328 (step 1004). In these examples, service 313 may have a set of requirements or a set of prerequisites for performing service 313. For example, service 313 may require that certain hardware and/or software be present in network data processing system 302 to perform service 313 for network data processing system 302. In operation 1004, the determination is made by comparing information 328 identified for network data processing system 302 to the set of requirements for service 313. If all the hardware and/or software needed to perform service 313 is not available, service program/process 314 generates a notification that additional hardware and/or software need to be added to network data processing system 302 (step 1006).

Thereafter, service program/process 314 identifies set of modules 320 for performing service 313 (step 1008). Each module in set of modules 320 includes a set of steps for performing at least a portion of service 313. Service program/process 314 then identifies set of software tools 326 for performing service 313 (step 1010). Step 1010 may be performed by identifying set of software tools 326 that have a capability to perform steps 324 identified using information 328. In some illustrative examples, the identification of set of software tools 326 may identify that no software tools are needed to perform the steps in set of modules 320.

Next, service program/process 314 performs the steps in set of modules 320 using set of software tools 326 to perform service 313 (step 1012). Service program/process 314 identifies performance information generated while performing service 313 (step 1014), with the process terminating thereafter. In step 1014, the performance information may be identified from information received by set of agents 340.

With reference again to operation 1004, if all of the hardware and/or software needed to perform service 313 is available, the process proceeds to step 1008 as described above.

Figure 11:
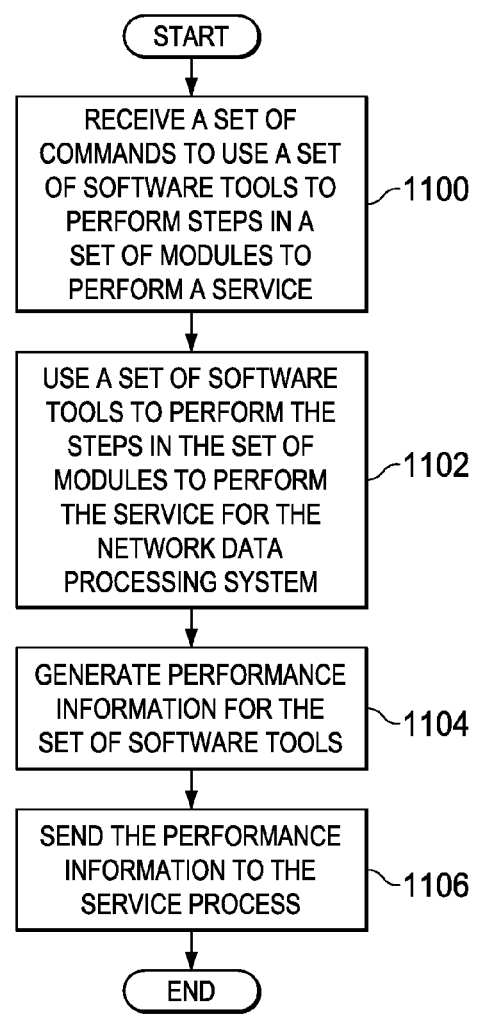
FIG. 11 is an illustration of a flowchart of a process for performing a service in accordance with an illustrative embodiment of the present invention.

With reference now to FIG. 11, an illustration of a flowchart of a process for performing a service is depicted in accordance with an illustrative embodiment. The process illustrated in FIG. 11 may be implemented in program code for set of agents 340 in FIG. 3. This process may be implemented to perform service 313 for network data processing system 302 in FIG. 3.

The process begins by set of agents (i.e. agent programs) 340 receiving a set of commands to use set of software tools 326 to perform steps in set of modules 320 to perform service 313 (step 1100). In this step, the set of modules for performing service 313 is identified in step 1008 in FIG. 10 by service program/process 314. Further, the set of software tools is identified in step 1010 in FIG. 10 by service program/process 314.

Thereafter, set of agents 340 uses set of software tools 326 to perform the steps in set of modules 320 to perform service 313 for network data processing system 302 (step 1102). Set of agents 340 generates performance information for set of software tools 326 (step 1104). Step 1104 is performed by set of agents 340 tracking each step performed in set of modules 320 and identifying the amount of time taken to perform each step. In this illustrative example, the performance information may be generated while set of software tools 326 are being used to perform the steps in set of modules 320.

Then, set of agents 340 send the performance information to service program/process 314 (step 1106), with the process terminating thereafter.

Figure 12:
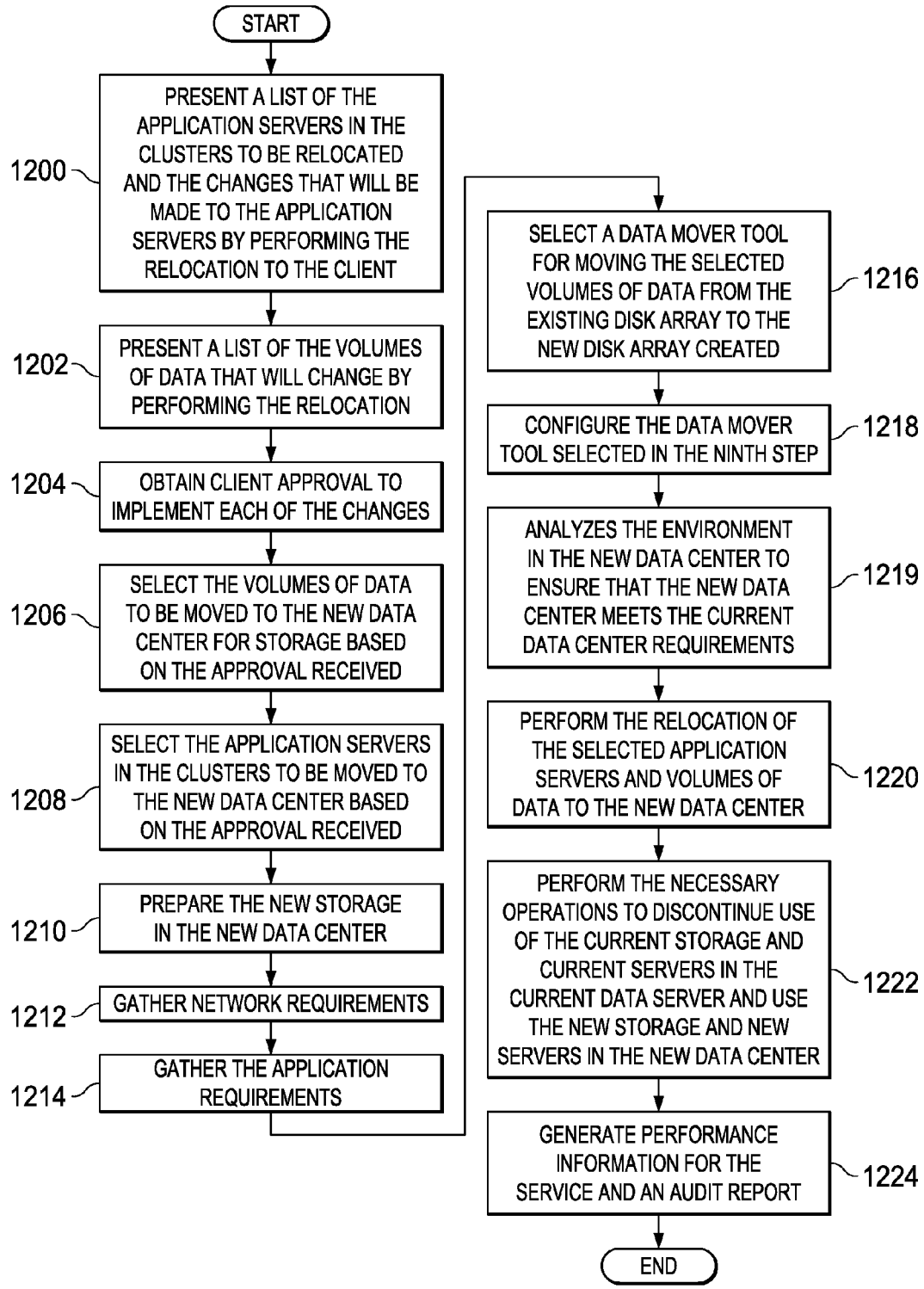
FIG. 12 is an illustration of a flowchart of a process for performing steps in a runbook in accordance with an illustrative embodiment of the present invention.

With reference now to FIG. 12, an illustration of a flowchart of a process for performing steps in a runbook is depicted in accordance with an illustrative embodiment. The process illustrated in FIG. 12 may be implemented for a runbook, such as a runbook in set of modules 320 in FIG. 3 and/or in set of runbooks 416 in FIG. 4. A runbook is a set of extensible markup language (XML) definitions of steps that are used to perform a service. In this illustrative example, the runbook includes steps that are to be performed to relocate clusters of application servers from a current data center to a new data center. This runbook may be an example of a runbook in, for example, set of modules 320 in FIG. 3 and/or in set of runbooks 416 in FIG. 4.

The process begins by service program/process 314 presenting a list of the application servers in the clusters to be relocated and the changes that will be made to the application servers by performing the relocation to the client (step 1200). In operation 1200, service program/process 314 generates the list of the application servers in the clusters to be relocated based on information 328 identified for network data processing system 302. Service program/process 314 then presents a list of the volumes of data that will change by performing the relocation (step 1202). Thereafter, the process obtains client approval to implement each of the changes (step 1204).

In this illustrative example, service program/process 314 selects the volumes of data to be moved to the new data center for storage based on the approval received (step 1206). Service program/process 314 selects the application servers in the clusters to be moved to the new data center based on the approval received (step 1208).

Thereafter, service program/process 314 prepares the new storage in the new data center (step 1210). This step may involve, for example, creating a new disk array. In particular, this step may involve creating a new redundant array of independent disks. Step 1210 requires a disk array tool to provision and prepare the new disk array. In this illustrative example, the environment for the new disk array has been identified as comprising a PowerPc running the Linux operating system.

Using table 700 in FIG. 7, service program/process 314 selects a compatible software tool from software tools 702. In this illustrative example, redundant array of independent disks (RAID) configuration utility 712 in FIG. 7 is compatible and is selected by service program/process 314. This software tool is used to perform step 1210 in the runbook before performing step 1212 in the runbook in this illustrative example.

Additionally, performance information for the software tool may be generated by service program/process 314. This performance information may be generated to confirm that step 1210 was performed by service program/process 314 correctly.

Service program/process 314 then gathers network requirements (step 1212). Performing this step requires a network monitoring tool to run remote network tests, such as bandwidth tests and network quality tests, to establish the capacity and quality of the current and new data center networks. These types of tests are also used to determine network latency. Based on information about the operating systems and hardware of the computers location in the current and new data centers, service program/process 314 uses table 700 to identify network manager 720 in FIG. 7 as a compatible network monitoring tool.

Service program/process 314 gathers the application requirements (step 1214). Application requirements are the application capacity and performance requirements for the clusters. These requirements include, for example, without limitation, network, disk space, memory, computer processing unit (CPU), and availability. Performing this step requires a cluster management tool, which provides information about the type and/or amount of resources being used by applications. Based on information about the operating systems and hardware of the computers location in the current and new data centers, service program/process 314 uses table 700 to identify application server network deployment administration tool 722 in FIG. 7 as a compatible cluster management tool.

Thereafter, service program/process 314 selects a data mover tool for moving the selected volumes of data from the existing disk array to the new disk array created (step 1216).

Using information about the disk arrays and about the operating systems and hardware in the current and new data centers and using table 700, storage manager A 716 in FIG. 7 is selected as a compatible data mover tool.

Service program/process 314 configures the selected data mover tool (step 1218). Storage manager A 716 in FIG. 7 is configured in this step. Service program/process 314 analyzes the environment in the new data center to ensure that the new data center meets the current data center requirements (step 1219). In other words, the environments of the current and new data centers are compared to ensure that no changes would prevent the relocation from being completed.

Next, service program/process 314 performs the relocation of the selected application servers and volumes of data to the new data center (step 1220). This step is performed using storage manager A 716 in FIG. 7. Service program/process 314 performs the necessary operations to discontinue use of the current storage and current servers in the current data server and use the new storage and new servers in the new data center (step 1222).

Thereafter, service program/process 314 generates performance information for the service and an audit report (step 1224), with the process terminating thereafter. The audit report tracks the operations that were completed in performing the relocation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-readable medium providing program code for use by or in connection with a computer or any instruction system.

The computer readable storage medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during running of the code.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing a service, the method comprising:
 a computer identifying information about a configuration of hardware and software in a network data processing system for performing the service on the network data processing system, the information comprising at least one of a type of operating system in the network data processing system, a type of cluster used in the network data processing system, and a configuration of the cluster;
 the computer identifying a plurality of steps used to perform the service;
 based in part on the identified information, the computer identifying a set of software tools needed in each step in the plurality of steps to perform the service on the network data processing system;

the computer initiating performance of the plurality of steps by one or more agent programs in the network data processing system;

the computer monitoring the performance of the plurality of steps to identify performance information;

the computer identifying a cost to perform the service using the performance information; and the computer generating an audit report that tracks completion of each of the plurality of steps taken by the one or more agent programs.

2. The method of claim 1, wherein the computer identifying the plurality of steps used to perform the service comprises:

the computer checking a database of user identified modules for performing the service, wherein the user identified modules include program code for performing the plurality of steps.

3. The method of claim 1, wherein the computer identifying the set of software tools needed in the each step in the plurality of steps to perform the service comprises:

the computer identifying the set of software tools needed in the each step in the plurality of steps to perform the service using a table identifying software tools.

4. The method of claim 1, wherein the computer identifying the information about the configuration of the hardware and the software in the network data processing system comprises:

the computer identifying the information about the configuration of the hardware and the software in the network data processing system from at least one of receiving user input, programs running in the network data processing system, and the hardware in the network data processing system.

5. The method of claim 1, wherein the plurality of steps is located in a number of runbooks.

6. A computer comprising:

a processor unit;

a computer-readable memory;

a computer-readable tangible storage device; and first program code for identifying information about a configuration of hardware and software in a network data processing system for performing a service on the network data processing system, the information comprising at least one of a type of an operating system in the network data processing system, a type of cluster used in the network data processing system, and a configuration of the cluster;

second program code for identifying a plurality of steps used to perform the service;

third program code for identifying, based in part on the identified information, a set of software tools needed in each step in the plurality of steps to perform the service on the network data processing system;

fourth program code for initiating performance of the plurality of steps by one or more agent programs in the network data processing system;

fifth program code for monitoring the performance of the plurality of steps to identify performance information;

sixth program code for identifying a cost to perform the service using the performance information; and seventh program code for generating an audit report that tracks completion of each of the plurality of steps taken by the one or more agent programs, wherein the first program code, the second program code, the third program code, the fourth program code, the fifth program code, the sixth program code, and the seventh program code are stored in the computer-readable tangible storage device for processing by the processor unit via the computer-readable memory.

7. The computer of claim 6, wherein the second program code for identifying the plurality of steps used to perform the service comprises:

program code for checking a database of user identified modules for performing the service, wherein the user identified modules include program code for performing the plurality of steps.

8. The computer of claim 6, wherein the third program code for identifying the set of software tools needed in the each step in the plurality of steps to perform the service comprises:

program code for identifying the set of software tools needed in the each step in the plurality of steps to perform the service using a table identifying software tools.

9. The computer of claim 6, wherein the first program code for identifying the information about the configuration of the hardware and the software in the network data processing system comprises:

program code for identifying the information about the configuration of the hardware and the software in the network data processing system from at least one of receiving user input, programs running in the network data processing system, and the hardware in the network data processing system.

10. A computer program product comprising:

a computer-readable tangible storage device;

program code, stored on the computer-readable tangible storage device, for identifying information about a configuration of hardware and software in a network data processing system for performing a service on the network data processing system, the information comprising at least one of a type of an operating system in the network data processing system, a type of cluster used in the network data processing system, and a configuration of the cluster;

program code, stored on the computer-readable tangible storage device, for identifying a plurality of steps used to perform the service;

program code, stored on the computer-readable tangible storage device, for identifying, based in part on the identified information, a set of software tools needed in each step in the plurality of steps to perform the service on the network data processing system;

program code, stored on the computer-readable tangible storage device, for initiating performance of the plurality of steps by one or more agent programs in the network data processing system;

program code, stored on the computer-readable tangible storage device, for monitoring the performance of the plurality of steps to identify performance information;

program code, stored on the computer-readable tangible storage device, for identifying a cost to perform the service using the performance information; and program code, stored on the computer-readable tangible storage device, for generating an audit report that tracks completion of each of the plurality of steps taken by the one or more agent programs.

11. The computer program product of claim 10, wherein the program code, stored on the computer-readable tangible storage device, for identifying the plurality of steps used to perform the service comprises:

program code, stored on the computer-readable tangible storage device, for checking a database of user identified modules for performing the service, wherein the user identified modules include program code for performing the plurality of steps.

12. The computer program product of claim 10, wherein the program code, stored on the computer-readable tangible storage device, for identifying the set of software tools needed in the each step in the plurality of steps to perform the service comprises:

program code, stored on the computer-readable tangible storage device, for identifying the set of software tools needed in the each step in the plurality of steps to perform the service using a table identifying software tools.

13. The computer program product of claim 10, wherein the program code, stored on the computer-readable tangible storage device, for identifying the information about the configuration of the hardware and the software in the network data processing system comprises:

program code, stored on the computer-readable tangible storage device, for identifying the information about the configuration of the hardware and the software in the network data processing system from at least one of receiving user input, programs running in the network data processing system, and hardware in the network data processing system.

\* \* \* \* \*